Figure 1:
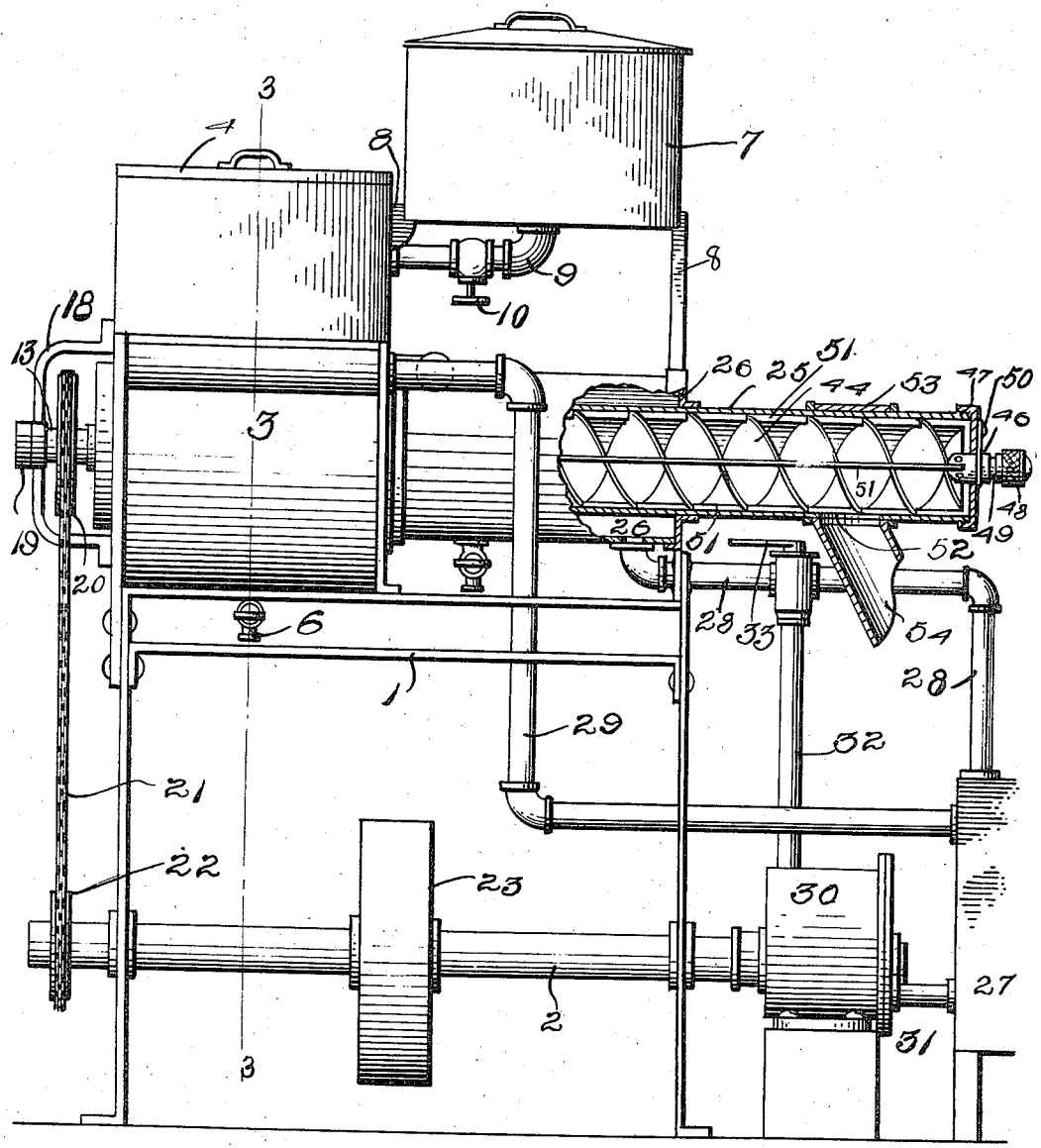

R. LIDDELL.
ICE CREAM FREEZER.
APPLICATION FILED OCT. 13, 1910.

995,975.

Patented June 20, 1911.

3 SHEETS—SHEET 1.

Witnesses

Inventor
Robert Liddell
By E. E. Trueman,
Attorney.

R. LIDDELL.
ICE CREAM FREEZER.
APPLICATION FILED OCT. 13, 1910.
995,975.
Patented June 20, 1911.
3 SHEETS—SHEET 2.
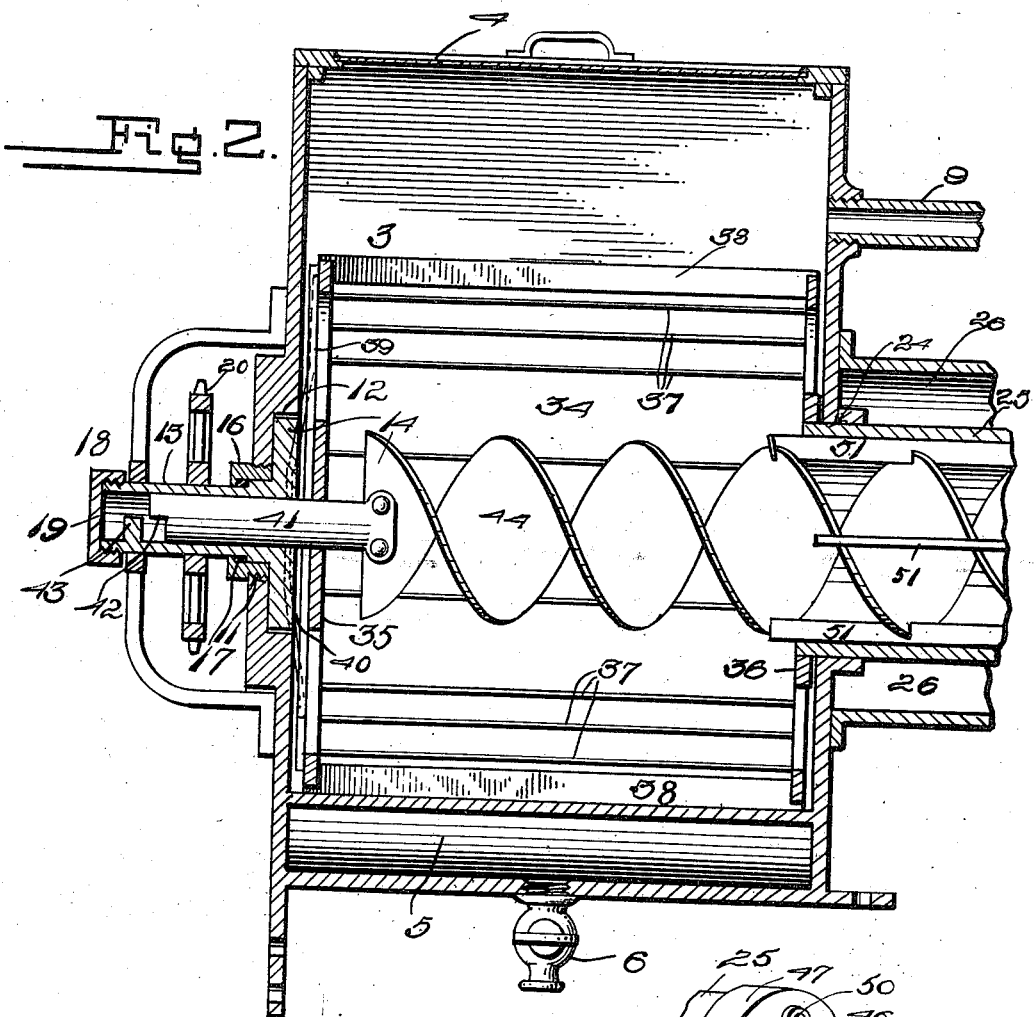
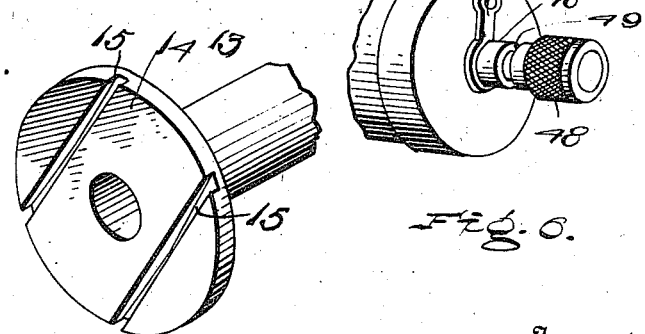
Witnesses
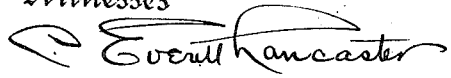
Inventor
Robert Liddell
Attorney

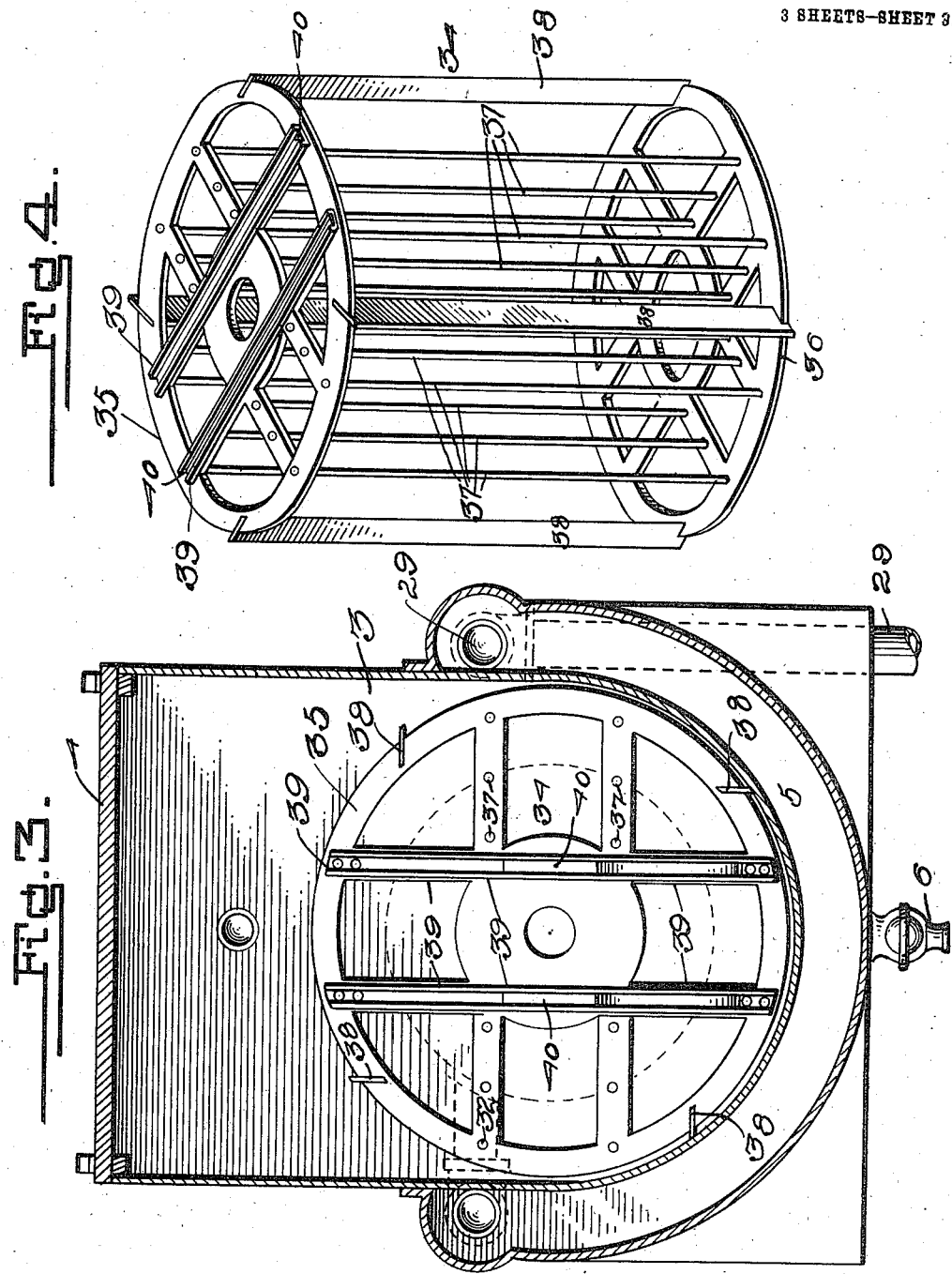

UNITED STATES PATENT OFFICE.

ROBERT LIDDELL, OF TECUMSEH, NEBRASKA.

ICE-CREAM FREEZER.

995,975.

Specification of Letters Patent. Patented June 20, 1911.

Application filed October 13, 1910. Serial No. 586,928.

*To all whom it may concern:*

Be it known that I, ROBERT LIDDELL, a citizen of the United States of America, residing at Tecumseh, in the county of Johnson and State of Nebraska, have invented certain new and useful Improvements in Ice-Cream Freezers, of which the following is a specification, reference being had therein to the accompanying drawing.

This invention relates to the subject of ice cream making, and the principal object of the same is to provide a machine in which the making of the ice cream is simplified and in which novel means are provided for circulating a cooling medium through the machine.

The invention also contemplates the employment of an improved agitator and means for rotating the same, and means for discharging the ice cream from the machine.

In carrying out the objects of the invention generally stated above, it will be understood, of course, that the essential features thereof are necessarily susceptible of changes in details and structural arrangements; one preferred and practical embodiment of which is shown in the accompanying drawings, wherein,—

Figure 1 is a view in side elevation, partly in section, of the improved ice cream machine. Fig. 2 is a fragmentary longitudinal vertical sectional view thereof. Fig. 3 is a transverse vertical sectional view taken on the line 3—3, Fig. 1. Fig. 4 is a detail perspective view of the agitator. Fig. 5 is a fragmentary detail perspective view of the inner end of the drive shaft. Fig. 6 is a fragmentary detail perspective view showing the manner of locking the conveyer in an operative or inoperative position.

Referring to the accompanying drawings by numerals, it will be seen that the improved ice cream machine has been shown mounted upon a supporting stand 1 which has a power shaft 2 horizontally journaled in the lower portion thereof. A casing 3 provided with a semi-cylindrical bottom is arranged on said stand 1 and is provided with a lid or cover 4 for the upper end which controls access to the interior of said casing. The lower portion of said casing is provided with a jacket 5 for a cooling medium, such as brine, and a cock 6 depends from said jacket 5 so that the same can be drained when necessary or desirable. A milk and cream receptacle 7 is carried by brackets 8 projecting from the upper portion of the casing 3, said receptacle having a pipe communication 9 with said casing, said pipe being equipped with a controlling valve 10. The outer end of said casing 3 is provided with a central opening 11 that is surrounded by an internal recess 12. A hollow power shaft 13 extends through the opening 11 and is provided with an end flange 14 that is rotatably fitted within recess 12. Said flange 14 is provided with holding slots 15. A bushing 16 and gasket 17 seal the opening 11 liquid-tight. The outer end of shaft 13 is journaled in a bracket bearing 18 projecting from the casing 3, said outer end being sealed by a cap 19. A sprocket wheel 20 is fast on shaft 13 and has a chain connection 21 with a sprocket wheel 22 carried by the power shaft 2. Said power shaft 2 carries a pulley 23 by means of which the same may be connected to a source of power, not shown.

The inner end of casing 3 is provided with a central opening 24, through which one end of a cylindrical casing 25 projects. Said casing is surrounded for a portion of its length by a cooling jacket 26, one portion of said jacket communicating with one end of jacket 5 of casing 3.

A brine tank 27 is suitably supported adjacent the stand 1 and has a pipe communication 28 with jacket 26 and another pipe communication 29 with jacket 5. A pump 30 is operated by the power shaft 2, said pump having a pipe communication 31 with tank 27 and a pipe communication 32 with the outlet pipe 28 of said tank. A three-way valve 33 is located at the junction of pipes 28 and 32. This arrangement of pipes causes the brine or other cooling medium to be circulated through pipe 28, jackets 26 and 5 and returned to the tank through the pipe 29. And, as will be obvious, the cooling medium can be cut off from the jackets by manipulating valve 33 so that the said cooling medium will circulate only through a portion of pipes 28 and 32, the pump 30, and through pipe 31 to the tank 27. This permits the pump to be continued in operation while the supply of cooling medium to the body of the machine is cut off.

An agitator 34 is provided for the casing 3 and is composed of the skeleton end disks 35 and 36, which are connected by the tie rods 37. The peripheries of said disks are connected by the blades 38. End disk 35 is provided with a pair of channel irons 39 in which bowed springs 40 are mounted. Said springs have their outwardly projecting portion seated in the holding slots 15 of flange 14. End disk 36 is journaled on the projected inner end of casing 25. Flange 14 being integral with shaft 2, it will be seen that a rotation of said shaft will similarly actuate the agitator 34.

A stub shaft 41 extends into power shaft 2 and has an end notch 42 for engaging a lug 43 within shaft 2 to lock said shafts together. The inner end of shaft 41 projects through end disk 35 of the agitator 34 and is riveted or otherwise rigidly attached to a spiral conveyer 44 that projects through casing 25 and into the agitator. The outer end of the conveyer 44 is equipped with a head 46 that projects through the cap 47 that seals the outer end of casing 25. The free end of said head is milled or otherwise roughened to provide a handgrip 48. The conveyer 44 and stub shaft 41 are longitudinally slidable in casings 3 and 25 and are moved longitudinally by manipulating handgrip 48 to clutch shaft 41 to the lug 43 in shaft 2 so that the conveyer will rotate with said shaft 2. The head 46 is provided with transverse grooves 49 which are selectively engaged by the latch 50 pivoted to cap 47 to lock the shaft 41 in engagement with, or disengaged from, shaft 2. Only one groove is clearly shown in the drawings for the reason that the latch 50 is in engagement with the other groove. Blades 51 are carried by the conveyer 44 for scraping the inner surface of casing 25.

Adjacent the outer end, casing 25 is provided with a discharge outlet 52 in its base, the discharge therefrom being regulated by a sleeve 53 that is rotatable on said casing and provided with a pendent chute 54 which, when in alinement with outlet 52, conveys material therefrom. To seal said outlet, the sleeve 53 is rotated to remove the chute out of alinement with the outlet.

In operation, the cream and milk is fed into casing 3 from receptacle 7, and the conveyer 44 having been uncoupled from shaft 2, so that the conveyer is idle, the shaft 2 rotates the agitator to thoroughly whip the cream and milk, the pump 30 being operated to force the cooling medium through the jackets 5 and 26 to keep the casings 3 and 25 at a freezing temperature. When the material has been whipped to the desired consistency, the conveyer 44 is clutched to shaft 13 and sleeve 53 rotated to place the chute in communication with the discharge outlet 52, so that the ice cream will be removed from the machine.

It will be seen from the foregoing that this machine provides quick and efficient means for producing ice cream, the operation being practically continuous.

What I claim as my invention is:—

1. An ice cream freezer comprising a support, an agitator casing therein, a conveyer casing projecting from said agitator casing, means for supplying material to said agitator casing, means for circulating a cooling medium around said casings, an agitator in the agitator casing, a conveyer in the conveyer casing, a power shaft for operating said agitator and conveyer, manually controlled means for disconnecting the conveyer from said shaft, said conveyer casing provided with a discharge outlet, and means for controlling the discharge from said outlet.

2. An ice cream freezer comprising an agitator casing, a conveyer casing projecting therefrom and provided with a discharge outlet, a hollow power shaft projecting into the agitating casing, means for rotating said shaft, an agitator operated by said shaft, a conveyer slidable in the conveyer casing and through said agitator and adapted for clutching engagement with said shaft, means for circulating a cooling medium around said casings, and means for regulating the discharge from said outlet.

3. An ice cream freezer comprising an agitator casing provided with a cooling jacket, a conveyer casing provided with a cooling jacket, means for circulating a cooling medium through said jackets, means for feeding material to the agitator casing, an agitator therein, a conveyer in the conveyer casing, means for operating said agitator and conveyer, means for rendering said conveyer idle, and common means for locking the conveyer in an operative or inoperative position.

4. An ice cream freezer comprising a pair of communicating casings, an agitator in one casing, a conveyer in the other casing and projecting into said agitator, a hollow power shaft for connecting the agitator to the power shaft, means for coupling the conveyer to the power shaft, means for supplying material to the agitator casing, means for supplying cooling medium to said casings, and discharge means carried by the conveyer casing.

5. An ice cream freezer comprising a pair of communicating casings, agitating means in one casing, conveying means in the other casing, said conveying casing being provided with a discharge outlet, said casings provided with cooling jackets, means for circulating a cooling medium through said jackets, a sleeve rotatably surrounding the conveying casing, and a discharge chute carried by said sleeve and adapted to be alined with said outlet to discharge material from said conveying casing.

6. An ice cream freezer comprising an agitator casing provided with an end opening and a surrounding recess, a hollow power shaft projecting through said opening and having an end flange seated in said recess, said flange provided with slots, an agitator in said casing and having end springs for engaging said slots, means for rotating said shaft, means for feeding material to said casing, and means for removing ice cream from said casing.

7. An ice cream freezer comprising an agitator casing, a hollow power shaft projecting therein, means for rotating said shaft, an agitator in said casing, means for engaging the same with said shaft, a conveyer casing, a conveyer slidable therein, a shaft projecting from one end of said conveyer for engaging the power shaft, means for longitudinally sliding said conveyer, and discharge means carried by said conveyer casing.

8. An ice cream freezer comprising a pair of communicating casings, conveying means in one casing, agitating means in the other casing, means for cooling said casings, a hollow power shaft for operating said agitating and conveying means, means for rendering the conveying means inactive, and discharge means carried by the casing that is provided with the conveying means.

9. An ice cream freezer comprising a pair of communicating casings, one casing provided with a discharge outlet, a sleeve rotatably mounted over said outlet and provided with a discharge chute for receiving material from said outlet, agitating means in one casing, means for removing ice cream therefrom and delivering the same to said outlet, and means for cooling said casings.

10. An ice cream freezer comprising an agitator and a conveyer casing, an agitator in the agitator casing, a conveyer slidable in said casings, a power shaft for operating the agitator, means for coupling the conveyer to the power shaft, a head for longitudinally moving the conveyer to connect the same with or disconnect the same from the power shaft, said head projecting beyond one end of said conveyer casing, and being provided with regularly spaced circumferential grooves and a latch pivotally connected to said conveyer casing for selective engagement with said grooves to lock the conveyer against longitudinal movement.

11. An ice cream freezer comprising an agitator casing, an agitator thereon, a conveyer casing, a conveyer therein, said casings provided with communicating cooling jackets, a pump, a cooling liquid tank in communication with said pump, a pipe connection between the tank and the jacket of the conveyer casing, a pipe connection between the jacket of the agitator casing and said tank, a pipe connecting the pump with the conveyer jacket pipe, and a three-way valve at the junction of the pump pipe and the conveyer jacket pipe whereby the cooling liquid can be prevented from passing through said jacket without stopping the pump.

In testimony whereof I hereunto affix my signature in presence of two witnesses.

ROBERT LIDDELL.

Witnesses:
M. E. COWAN,
JESSIE DEW.